No. 657,911. Patented Sept. 18, 1900.
G. D. BURTON.
APPARATUS FOR SEPARATING METALS FROM ORES BY ELECTRICITY.
(Application filed Nov. 1, 1897.)

(No Model.) 4 Sheets—Sheet 1.

No. 657,911. Patented Sept. 18, 1900.
G. D. BURTON.
APPARATUS FOR SEPARATING METALS FROM ORES BY ELECTRICITY.
(Application filed Nov. 1, 1897.)
(No Model.) 4 Sheets—Sheet 2.
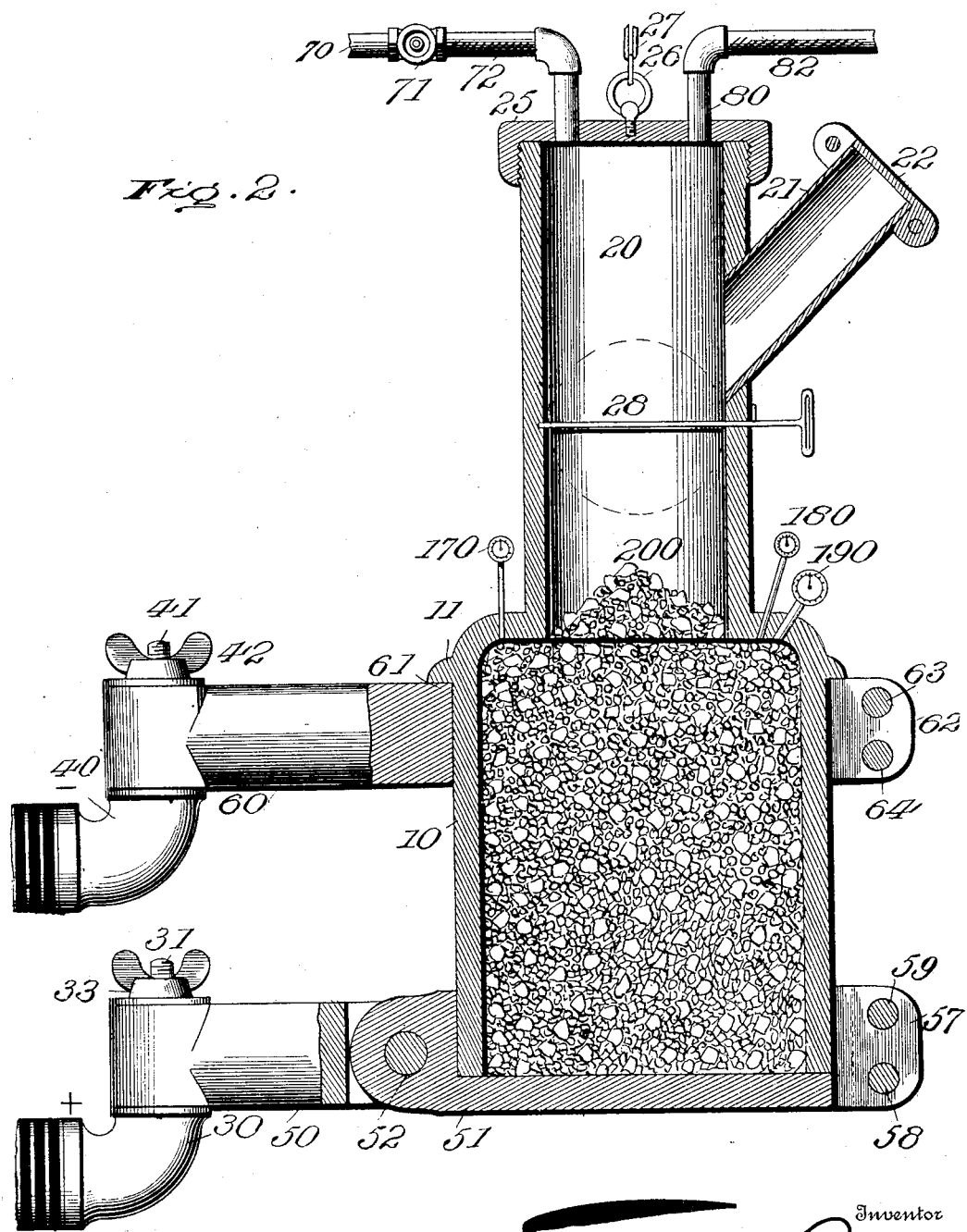

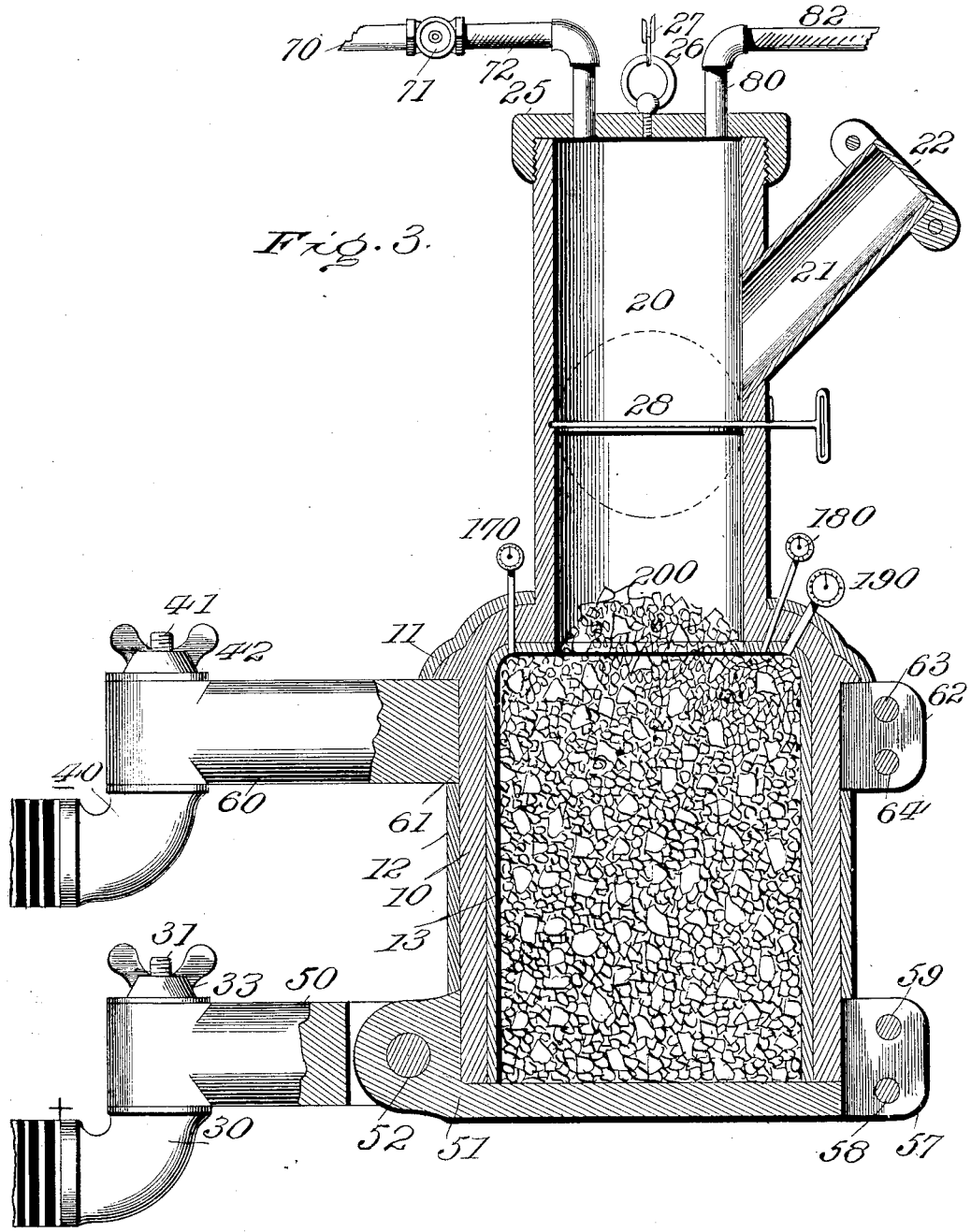

No. 657,911. Patented Sept. 18, 1900.
G. D. BURTON.
APPARATUS FOR SEPARATING METALS FROM ORES BY ELECTRICITY.
(Application filed Nov. 1, 1897.)
(No Model.) 4 Sheets—Sheet 4.
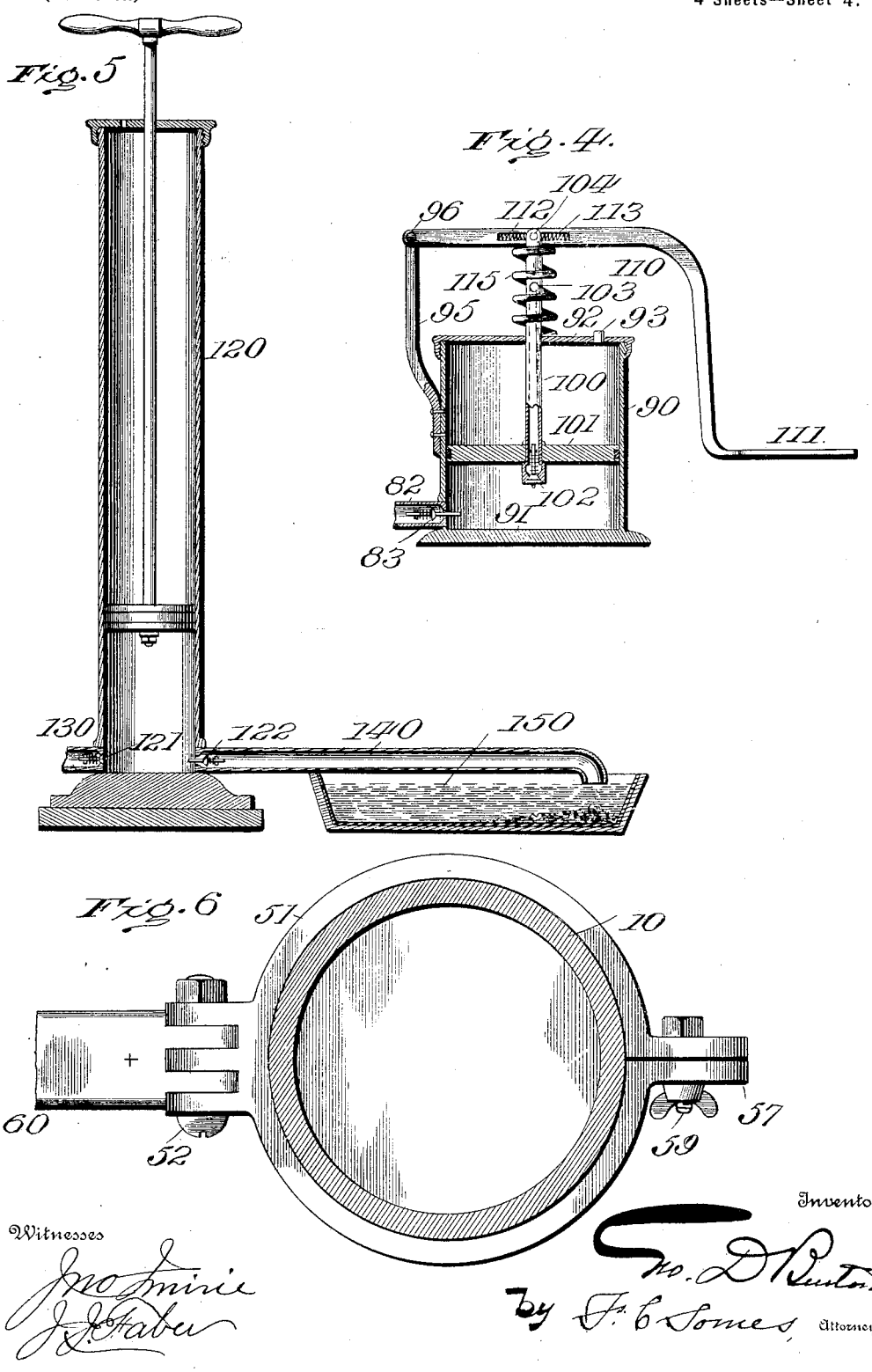

UNITED STATES PATENT OFFICE.

GEORGE D. BURTON, OF BOSTON, MASSACHUSETTS.

APPARATUS FOR SEPARATING METALS FROM ORES BY ELECTRICITY.

SPECIFICATION forming part of Letters Patent No. 657,911, dated September 18, 1900.

Application filed November 1, 1897. Serial No. 657,061. (No model.)

*To all whom it may concern:*

Be it known that I, GEORGE D. BURTON, a citizen of the United States of America, residing in Boston, in the county of Suffolk, in the State of Massachusetts, have invented certain new and useful Improvements in Apparatus for Separating Metals from Ores by Electricity, of which the following is a specification.

This invention relates to an apparatus for reducing refractory ores containing gold, silver, or other metal united with sulfur, arsenic, or other rebellious substance in a rapid, thorough, and economical manner.

The invention consists in an electric furnace of peculiar construction, which is preferably connected with an electrical apparatus for producing a current of large volume, preferably similar to that described in patents of the United States No. 475,232, to George D. Burton, Arthur H. Eddy, and George T. Briggs, dated May 17, 1892; No. 486,625, to George D. Burton, dated November 22, 1892, and No. 475,184, to George D. Burton, dated May 17, 1892. I have used an apparatus of this character producing an alternating current of sixteen hundred to eighteen hundred volts and twenty-four amperes transformed into a current of from four to sixteen volts and from six thousand to seven thousand amperes.

Figure 1 of the accompanying drawings represents a side elevation of this apparatus. Fig. 2 represents a vertical section of the furnace constituting a part of this apparatus. Fig. 3 also represents a vertical section of the furnace provided with an exterior and interior lining of refractory material. Fig. 4 represents a vertical section of a force-pump which may be used as a part of the apparatus for forcing air into the furnace. Fig. 5 represents a vertical section of an exhaust-pump constituting a part of the apparatus for drawing off the sulfurous or other fumes formed in the furnace and a vertical section of the tank for collecting the sulfur or arsenic contained in said fumes. Fig. 6 represents a horizontal section of the furnace and a plan of the lower electrode encircling said furnace.

The same reference-numbers indicate corresponding parts in all the figures.

The furnace comprises a reducing-chamber 10 and a short stack 20, surmounting said chamber. These parts are composed of a material which is a conductor of electricity and which will withstand a very high degree of heat. A satisfactory material for this purpose is a carbon compound, such as that used in making carbon crucibles, or a composition consisting of three parts copper, two parts antimony, and one part tin. I have used for this purpose a material furnished by the Pennsylvania Steel Company capable of withstanding a temperature of 6,000° Fahrenheit, the composition of said material being to me unknown. The stack may be composed of the same material as the reducing-chamber or of a different material. The reducing-chamber is provided near its upper end with an exterior flange 11. The furnace is supported by two electrodes, of copper or other highly-conductive material, which are connected, respectively, to the positive and negative terminals of a transformer similar to that shown in the patents above cited or other suitable source of heating-current. The terminals may consist of two upwardly-bent arms 30 and 40, composed of copper or other highly-conductive material, extending outward from the transformer referred to. The lower electrode 50 is illustrated as connected with the positive terminal, being swiveled horizontally on a pivot 31 on said terminal and clamped by means of a set-nut 33 or otherwise connected with said terminal, so as to form a good contact. The outer part 51 of the electrode is preferably connected to the inner part 50 by means of a hinge 52 and constitutes the bottom of the furnace, the lower end of the reducing-chamber setting thereinto. An opening 56 is provided on one side, registering with the tap-hole of the furnace for the passage of molten metal. The hinged bottom is preferably made in the form of a clamp, the parts thereof being provided with ears, as 57, having clamping-screws 58 and 59, by which it is pressed against the body of the reducing-chamber to form a good contact.

The upper electrode 60 is shown as connected with the negative terminal 40 and is swiveled on a pin 41, constituting a part of said terminal and clamped thereon by means of a clamp-nut 42. The outer end of this upper swiveling electrode is in the form of a clamp 61, composed of two semicircular parts having lugs, as 62, at their outer ends, said lugs being provided with clamping-bolts 63 and 64, whereby the electrode is clamped firmly against the body of the reducing-chamber, so as to form a good electric contact therewith. The body of the reducing-chamber is preferably covered between and above the electrodes by an external lining 12 of clay, put on in a plastic state, or other suitable material. It may also have an internal lining 13 of similar material.

The stack 20 is provided with a laterally-inclined feed-pipe 21, through which the ore to be treated is fed into the furnace. The upper end of this pipe may be closed by a cap 22. The top of the stack 20 is closed by a cap 25, which may be screwed thereto. This cap is provided with a ring 26, to which a chain 27 is connected, said chain leading to a lifting apparatus (not shown) for the purpose of lifting the body of the furnace out of contact with the bottom thereof, so that the latter may swing downward to discharge the slag after the reduction has taken place. The stack is provided below the inlet of the feed-pipe 21 with a damper 28 to regulate the passage of ore to the reducing chamber or body of the furnace. An inlet-pipe 70 for steam enters the stack through the cap 25 and serves to admit steam to the furnace in downward direction onto the ore therein. This pipe is provided with a valve 71, and it has a flexible section 72 to permit the movement of the body of the furnace. Another pipe 80 may enter the furnace through the cap 25 and be connected with a force-pump for forcing air or other gas in downward direction into the furnace to aid combustion, or the pipe 70 may be used for air or gas as well as steam or for a mixture thereof. This pipe has a flexible section 82 to permit the furnace to be lifted. This force-pump may be of any suitable construction. When constructed as shown, the pump comprises a cylinder 90, closed by a bottom head 91 and a top head 92, the latter being provided with a central opening for the piston and with a vent 93. A hollow piston-rod 100 extends through the top head 92 and carries at its lower end a piston 101 and an automatic inlet-valve 102 for admitting air to the pump-cylinder. This piston-rod is provided with an inlet-hole 103 outside the pump-cylinder. The pump is provided with an automatic outlet-valve 183, opening into the pipe 80. A shoulder 95 is attached to the pump-barrel, and an actuating-lever 110 is pivoted by a pivot 96 to said standard. This lever may be of any suitable construction. As shown, it extends over the pump-barrel, thence downward, and thence outward, terminating in a foot-plate 111. The lever is provided with a slot 112, and a pivot-pin 104 passes through the hollow piston 100 and through the slot 112, forming a sliding pivoted connection between said rod and lever. A spiral spring 113 is disposed in the slot 112, and the pivot-pin 103 passes between the central coils of this spring. The spring thus tends to keep the piston-rod properly centered. A spring 115, interposed between the top of the cylinder and the lever 90, operates to lift the latter into normal position after it has been depressed.

An eduction-pump 120 is connected by a pipe 130 with the reducing-chamber of the furnace, near the top thereof, for drawing off the sulfur or arsenic vapors from said chamber. A pipe 140 extends from this pump and terminates over a collecting-tank 150, containing a watery liquid, onto which said vapors are discharged, the sulfur or other ingredients being precipitated into the tank. The pump 120 is provided with an induction-valve 121 opposite the pipe 130 and with an eduction-valve 122 at the entrance to the pipe 150. The pipe 130 is preferably composed in part of a flexible section, as 131, to permit the lifting of the body of the furnace.

A receptacle for the metal drawn off from the reducing-chamber is shown in the form of a crucible 160, disposed under the tap-hole of the furnace.

The furnace is provided with a steam-gage 170, air-gage 180, and a pyrometer 190. It is desirable to have the two forms of pressure-gages, so that in case one should become stopped by the fumes or otherwise rendered inoperative the other may operate.

In the use of the apparatus shown in Figs. 1, 2, and 6 the reducing-chamber 10 is filled with ore 200, containing metals to be extracted combined with rebellious substances, including usually combustible matter. The tap-hole is closed by wet clay in the usual manner until a product is to be drawn off. The electric current is turned on and passes from the terminal 30 through the electrode 50 and through the bottom 51, into and through the mass of ore to the electrode 60, and back to the transformer. The metal contained in the ore serves as a conductor for the current. A heat is first developed sufficient to eliminate the moisture, and then the current is increased, developing a heat sufficient to desulfurize the ore, the fumes of the sulfur, arsenic, or other such matter being drawn off by the suction-pump 120 and forced into the collecting-tank 150. This step is performed under exclusion of air, so that the by-products may not be consumed. The heat is then increased in the reducing-chamber by increasing the volume of the current, and steam or air or other gas containing oxygen is introduced into the heated mass. The gas aids combustion and the steam becomes superheated and aids combustion. The body of the furnace becomes heated by the passage of the current, and heat is radiated therefrom into the substance in the furnace, and the heat is also increased in the furnace by combustion. In case the ore has no combustible matter, such matter may be introduced with the charge. The mass of ore in the chamber and also the body of the furnace become heated, and after subjecting the ore to the combined heat of electricity and combustion for from five to ten minutes, more or less, the metal is fused and runs from the ore and can be drawn off through the tap-hole. When all the metal has been drawn off, the body of the furnace is raised by means of the chain 27 out of contact with the swinging bottom 51, and the latter drops of its own weight or on a slight knock being given to it, and the slag is discharged.

In the use of the apparatus shown in Fig. 3 the operation is the same as in the apparatus of Figs. 1 and 2, except that the current in this case enters the mass of ore through the bottom electrode and passes through the mass of ore to the stack when it reaches thereinto and is sufficiently conductive and through the walls of the stack and furnace to the negative electrode 60, or the current may be reversed in either case. The current also passes through the wall of the furnace from electrode to electrode and heats said wall, which radiates heat into the ore within.

In the use of the furnace for reducing ores (mixed with proper reducing agents) containing different metals having different fusing-points—say an ore having lead, silver, and gold—the heat can be readily regulated by means of the electric current so as to maintain it at a point above the fusing-point of lead and below that of silver, and the lead will be entirely eliminated and drawn off by itself, and then the current can be manipulated so as to raise the temperature to or above the fusing-point of silver and below that of gold until all the silver has been melted and drawn off separately, and then the current can be still further increased and the gold fused and drawn off. In the ordinary reduction process the heat cannot be regulated so as to accomplish these results. In that case a portion of the metal is volatilized and passes off in metallic vapor, and other metals are fused together into a single compound mass known in the art as "bullion," and each metal has to be separated by a separate process in order to get them into a commercial state. In the use of this apparatus where the heat is maintained at or above the fusing-point of one metal and below the fusing-point of the next harder metal the metals are each obtained in a pure state, and the process of separating them by a separate operation is avoided. In the case of some ores a flux is used. In others it is unnecessary.

The furnace may be used for reducing and separating bullion and for producing calcium carbid.

The passage of steam or gas under pressure in downward direction into and through the mass of ore in the furnace tends to prevent the escape of by-products and metallic particles which under an upward draft would float off and causes them to pass off through the tap and be saved. For instance, in the treatment of ores containing antimony, zinc, and lead, under an upward draft the antimony passes off in a vapor of antimony and the zinc in an oxid of zinc. In this process after the sulfur has been drawn off the heat is increased and air admitted under pressure above the mass of ore. If the tap-hole is closed for a given time and then opened, the lead will run, then the antimony, the lead carrying some portions of the zinc. The antimony and greater portion of the zinc will thus be saved. The downward current in the furnace at the proper time and the minute regulation of the heat by the electric current are important features.

The bottom plate of the furnace may be split, if desired; but this is not necessary, as there is sufficient spring in the material to effect a good contact with the body of the furnace.

I claim as my invention—

1. In an electric furnace, the combination of a reducing-chamber, the body of which is composed of electroconductive resistance material and provided with an exterior flange, an electrode adapted for contact with said chamber near the top thereof under said flange and serving as a support for said chamber, and another electrode adapted for connection with said chamber at the lower part thereof.

2. In an electric furnace, the combination of a reducing-chamber composed of electroconductive resistance material, an electrode connected with the upper part of said chamber, an electrode adapted to serve as a bottom for said chamber, and means for lifting said chamber from said bottom.

3. In an electric furnace, the combination of a reducing-chamber composed of electroconductive material, an electrode in electric connection with the upper part thereof, an electrode extending under said chamber, means for lifting said chamber from said bottom electrode, an exhaust-pump connected with said chamber, and means for supplying air, gas or steam to said chamber.

4. In an electric furnace, the combination of a reducing-chamber composed of conductive material and having a stack provided with means for feeding in the ore, said chamber being provided with an exterior flange, an electrode comprising a clamp adapted for contact with said chamber near the top thereof and under said flange and serving as a support for said chamber, an electrode adapted to serve as a bottom for said chamber, and means for passing a large heating-current through said electrode.

GEO. D. BURTON.

Witnesses:
CHAS. FOLLEN ADAMS,
E. F. PHILIPSON.